(12) United States Patent
Tewes (10) Patent No.: US 9,141,425 B2
(45) Date of Patent: Sep. 22, 2015

(54) FRAMEWORK FOR CRITICAL-PATH RESOURCE-OPTIMIZED PARALLEL PROCESSING

(75) Inventor: Martin Tewes, Dossenheim (DE)

(73) Assignee: SAP SE, Walldorf (DE)

( * ) Notice: Subject to any disclaimer, the term of this patent is extended or adjusted under 35 U.S.C. 154(b) by 263 days.

(21) Appl. No.: 13/608,525

(22) Filed: Sep. 10, 2012

(65) Prior Publication Data

US 2014/0075443 A1 Mar. 13, 2014

(51) Int. Cl.
G06F 9/48 (2006.01)
G06F 11/34 (2006.01)

(52) U.S. Cl.
CPC .......... *G06F 9/4881* (2013.01); *G06F 11/3433* (2013.01); *G06F 11/3447* (2013.01); *G06F 2209/484* (2013.01); *G06F 2209/485* (2013.01)

(58) Field of Classification Search
None
See application file for complete search history.

(56) References Cited

U.S. PATENT DOCUMENTS

| 7,865,606 | B1 | 1/2011 | Tewes et al. |
| 8,306,841 | B2 * | 11/2012 | Clarke .......... 705/7.23 |
| 8,387,066 | B1 * | 2/2013 | Becher et al. ......... 718/106 |
| 2012/0331476 | A1 * | 12/2012 | Saffre .......... 718/104 |
| 2014/0053161 | A1 * | 2/2014 | Sadowski ......... 718/102 |

* cited by examiner

*Primary Examiner* — Meng An
*Assistant Examiner* — Michael Ayers
(74) *Attorney, Agent, or Firm* — Fish & Richardson P.C.

(57) ABSTRACT

Computer-implemented methods, computer-program products, and systems instantiate a resource comsumption optimizer framework (RCOF) for a plurality of sub-process associated with a process. A plurality of sub-processes are loaded into a memory in accordance with a calculated optimized resource comsumption pattern. Each sub-process is associated with an agent that communicates with the RCOF. A particular sub-process is executed and the execution start is gated by an associated agent based upon at least a determined buffer value. The RCOF is notified of the particular sub-process execution completion.

21 Claims, 5 Drawing Sheets

FIG. 6

FRAMEWORK FOR CRITICAL-PATH RESOURCE-OPTIMIZED PARALLEL PROCESSING

BACKGROUND

Organizations implement parallel processing environments in order to increase the efficiency of a process by dividing the process into a number of sub-processes to be executed simultaneously with the goal of solving a problem in less time or solving a larger problem in the same time. Parallel processing environments implement resource control systems to handle/account for critical system resources such as memory, central processing unit (CPU) consumption, network bandwidth, file input output (I/O) limitations, memory speed, etc. during processing or the critical system can be improperly delayed by other non-critical processes. Often these resource control systems use a brute force methodology to ensure availability of the critical system resources. Regardless of a process' actual sub-process dependencies, the brute force methodology introduces latency into an overall parallel-processing time of the process. The introduced latency necessarily impacts the process' efficiency and affects an organization's provision of business applications and/or necessary data for use by customers. As a result, customers may choose more efficient alternate solutions.

SUMMARY

The present disclosure relates to computer-implemented methods, computer-program products, and systems for critical path, resource-optimized, parallel processing. One computer-implemented method includes instantiating a resource consumption optimizer framework (RCOF) for a plurality of sub-process associated with a process, loading the plurality of sub-processes into a memory in accordance with a calculated optimized resource consumption pattern, associating each sub-process of the plurality of sub-processes with an agent, wherein the agent communicates with the RCOF, executing a particular sub-process of the plurality of sub-processes loaded into the memory, wherein the sub-process execution start is gated by an associated agent based upon at least a determined buffer value, and notifying the RCOF of the particular sub-process execution completion.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by a data processing apparatus, cause the apparatus to perform the actions.

The foregoing and other implementations can each optionally include one or more of the following features:

A first aspect, combinable with the general implementation, further comprising, prior to the loading of the sub-processes into the memory, calculating the optimized resource consumption pattern.

In a second aspect, combinable with any of the previous aspects, the agent exposes an application programming interface (API) to the RCOF.

A third aspect, combinable with any of the previous aspects, further comprising determining that a particular sub-process of the plurality of sub-processes loaded into the memory can start execution.

A fourth aspect, combinable with any of the previous aspects, further comprising determining that the calculated optimized resource consumption pattern should be updated.

A fifth aspect, combinable with any of the previous aspects, further comprising updating the calculated optimized resource consumption pattern.

A sixth aspect, combinable with any of the previous aspects, further comprising determining where processing of the plurality of sub-processes is complete.

The subject matter described in this specification can be implemented in particular implementations so as to realize one or more of the following advantages. First, a described framework can be implemented in multiple processing environments that support resource measurement and control, for example through an operating system and/or programming language. Second, the framework can be used to facilitate processing of all processes with parallel-processing-capable sub-processes with dependencies. Third, overall throughput is increased in the process processing by reduction of overall process latency though intelligent distribution of available processing resources without slowing the process. Fourth, it is possible to execute a process with fewer resources in the same overall processing time by optimizing the latency of single sub-processes which reduces peak resource usage. As a result, the maximum available resources needed by a system to execute the process can remain the same and/or be reduced. Other advantages should be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure generally describes computer-implemented methods, computer-program products, and systems for critical path, resource-optimized, parallel processing.

Figure 1:
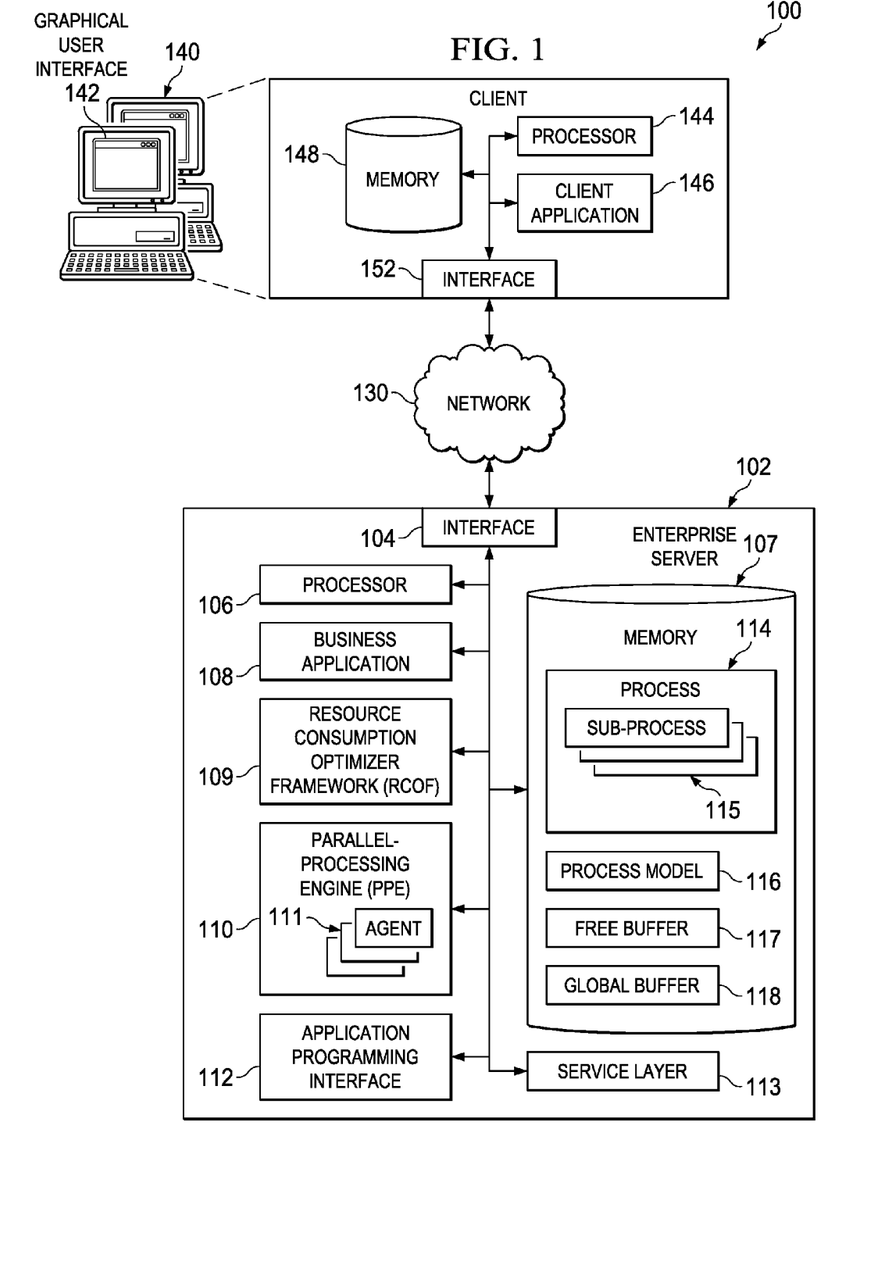
FIG. 1 is a block diagram illustrating an example system for critical path, resource-optimized, parallel processing.

FIG. 1 illustrates an example distributed computing system 100 for critical path, resource-optimized, parallel processing. At a high level, the illustrated example distributed computing system 100 includes or is communicably coupled with an enterprise server 102 and client 140 that communicate across a network 130. The enterprise server 102 comprises a computer operable to receive, transmit, process, store, or manage data and information associated with the example distributed computing system 100. In general, the enterprise server 102 is a server that stores a business application 108, resource consumption optimizer framework (RCOF) 109, and a parallel-processing engine (PPE) 110, where at least a portion of the business application 108, RCOF 109, and/or the PPE 110 is executed using requests and responses sent to a client 140 within and communicably coupled to the illustrated example distributed computing system 100 across network 130. In some implementations, the enterprise server 102 may store a plurality of various business applications 108, cipher engines 109, and/or decision engines 110. In other implementations, the enterprise server 102 may be a dedicated server meant to store and execute only a single business application 108, RCOF 109, and/or a PPE 110. In still other implementations, the enterprise server can store and execute none, a single instance, and/or a plurality of the business application 108, the RCOF 109, and/or the PPE 110. In some implementations, the enterprise server 102 may comprise a web server, where the business application 108, RCOF 109, and/or the PPE 110 represents one or more web-based applications accessed and executed by the client 140 using the network 130 or directly at the enterprise server 102 to perform the programmed tasks or operations of the business application 108, RCOF 109, and/or the PPE 110.

Specifically, the enterprise server 102 is responsible for receiving application requests, for example requests for critical path, resource-optimized, parallel processing, from one or more client applications associated with the client 140 of the example distributed computing system 100 and responding to the received requests by processing said requests in the associated business application 108, RCOF 109, and/or PPE 110, and sending an appropriate response from the business application 108, RCOF 109, and/or PPE 110 back to the requesting client application. In addition to requests from the client 140, requests associated with the business application 108, RCOF 109, and/or PPE 110 may also be sent from internal users, external or third-party customers, other automated applications, as well as any other appropriate entities, individuals, systems, or computers. According to one implementation, enterprise server 102 may also include or be communicably coupled with an e-mail server, a web server, a caching server, a streaming data server, and/or other suitable server. In other implementations, the enterprise server 102 and related functionality may be provided in a cloud-computing environment.

The enterprise server 102 includes an interface 104. Although illustrated as a single interface 104 in FIG. 1, two or more interfaces 104 may be used according to particular needs, desires, or particular implementations of the example distributed computing system 100. The interface 104 is used by the enterprise server 102 for communicating with other systems in a distributed environment—including within the example distributed computing system 100—connected to the network 130; for example, the client 140 as well as other systems communicably coupled to the network 130 (not illustrated). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated example distributed computing system 100.

In some implementations, any or all of the business application 108, RCOF 109, the PPE 110, and/or other components of the enterprise server 102, both hardware and/or software, may interface with each other and/or the interface 104 using an application programming interface (API) 112 and/or a service layer 113. The API 112 may include specifications for routines, data structures, and object classes. The API 112 may be either computer language independent or dependent and refer to a complete interface, a single function, or even a set of APIs. The service layer 113 provides software services to the example distributed computing system 100. The functionality of the enterprise server 102 may be accessible for all service consumers via this service layer. Software services, such as provide reusable, defined business functionalities through a defined interface. For example, the interface may be software written in Java, C++, or other suitable language providing data in extensible markup language (XML) format or other suitable format.

While illustrated as an integrated component of the enterprise server 102 in the example distributed computing system 100, alternative implementations may illustrate the service layer 113 as a stand-alone component in relation to other components of the example distributed computing system 100. Moreover, any or all parts of the service layer 113 may be implemented as child or sub-modules of another software module, enterprise application, or hardware module without departing from the scope of this disclosure.

The enterprise server 102 includes a processor 106. Although illustrated as a single processor 106 in FIG. 1, two or more processors may be used according to particular needs, desires, or particular implementations of the example distributed computing system 100. Generally, the processor 106 executes instructions and manipulates data to perform the operations of the enterprise server 102. Specifically, the processor 106 executes the functionality required to receive and respond to requests from the client 140 and/or for critical path, resource-optimized, parallel processing.

The enterprise server 102 also includes a memory 107 that holds data for the enterprise server 102. Although illustrated as a single memory 107 in FIG. 1, two or more memories may be used according to particular needs, desires, or particular implementations of the example distributed computing system 100. While memory 107 is illustrated as an integral component of the enterprise server 102, in alternative implementations, memory 107 can be external to the enterprise server 102 and/or the example distributed computing system 100. In some implementations, the memory 107 includes one or more instances of a process 114, a process model 116, a global buffer 118, and/or a free buffer 117.

The process 114 is a partially parallel-executable instance of executable computer program instructions. The process 114 is capable of being divided into a plurality of discrete processes, or sub-processes 115 with clearly defined dependencies between the sub-processes 115, for example execution time. Dividing the process 114 into sub-processes 115 is computationally advantageous in that processing the sub-processes 115 in parallel allows a faster completion time or reduced computing resource usage for the process 114 as a whole.

Processes 114 may have different states including, for example:

CREATED: process program code is loaded from a secondary storage device, for example a hard drive, into main memory for example random access memory (RAM), WAITING: process is waiting to be loaded into a processor, RUNNING: process begins to executed after being loaded into a processor, BLOCKED: the process needs to wait for a resource, for example database access or user input, TERMINATED: the process is stopped and/or removed from the processor.

These example process states are only representative of possible process states and definitions. One of ordinary skill will recognize that more or less process states are possible as well as different definitions of what constitutes the more or less process states. In some implementations, the process 114 and/or sub-process 115 can provide an API 112 as in interface with other components of the example distributed computing system 100.

The process model 116 is data specifying sub-processes 115 of a process 114, necessary sub-process 115 dependencies, sub-process 115 central processing unit (CPU) consumption values of each sub-process, and other suitable data associated with processes and sub-processes. In some implementations, the process model 116 can be determined at design-time and/or at run-time. For example, a software developer can create the process model 116 while designing a process 114 and/or an automated process (not illustrated) can analyze a process 114 and determine associated sub-processes 115 and the determined sub-process 115 dependencies prior to execution at run-time. The process model 116 is shared with the RCOF 109 (described below). In some implementations, the process model 116 can be stored in any suitable data structure, for example a text file, flat file, binary file, database, or other suitable data structure.

The business application 108 is any type of application or set of applications that allows the requesting, viewing, executing, changing, deleting, generating, or otherwise managing information associated with a business. Generally a business application 108 is used by business users to perform various business-related functions to increase productivity, measure productivity, and perform business functions accurately. Example business applications 108 may include human resources management, payroll management, invoicing, business process development/management, data processing, business trend analysis, analytics, etc. In some implementations, the business application 108 can use business application data (not illustrated) which is any type of data associated used by a business application and/or associated with a business object associated with a business application. For example, for a business application that calculates taxes on sales invoices, business application data for a specific sales invoice business object may include data pertaining to a particular sales invoice number, buyer, seller, date, address, product(s), quantity, price, tax rate, etc. The business application 108 can also use a process 114, sub-processes 115, a process model 116, a global buffer 118, a free buffer 117 and/or other component(s) of the example distributed computing system 100.

Once a particular business application 108 is launched, a client 140 may interactively process a task, event, or other information associated with the enterprise server 102. In some implementations, the business application 108 may manage one or more processes 114. The one or more processes 114 may include business processes performing and executing business process-related events. Generally, business processes communicate with clients 140, applications, systems, and components to send and receive events.

In some implementations, a particular business application 108 may operate in response to and in connection with at least one request received from other business applications 108, including a business application 108 associated with another enterprise server 102. In some implementations, the business application 108 can be and/or can include a web browser. In some implementations, each business application 108 can represent a web-based application accessed and executed by remote clients 140 across the network 130 (e.g., through the Internet, or using at least one cloud-based service associated with the business application 108). For example, a portion of a particular business application 108 may be a web service associated with the business application 108 that is remotely called, while another portion of the business application 108 may be an interface object or agent bundled for processing at a remote client 140.

Any or all of a particular business application 108 may be a child or sub-module of another software module or enterprise application (not illustrated) without departing from the scope of this disclosure. Still further, all or portions of the particular business application 108 may be executed or accessed by a user working directly at the enterprise server 102, as well as remotely at a corresponding client 140. Further, although illustrated as a single business application 108, the business application 108 may be implemented as multiple business applications 108 on the enterprise server 102.

The RCOF 109 is a service or a stand-alone application that, using one or more algorithms and process/sub-process data to manage critical path, resource-optimized, parallel processing of a process 114 and associated sub-processes 115 with respect to available system resources, such as CPU availability, network bandwidth, file I/O limitations, memory speed, etc. The RCOF 109 can be any application, program, module, process, or other software that may also provide methods and/or a graphical user interface necessary to perform its functions. In some implementations, the RCOF 109 can provide an API 112 as an interface with other components of the example distributed computing system 100.

In some implementations, the RCOF 109 uses the process model 116 to obtain process/sub-process data, the PPE 110 (described below), one or more agents 111 (described below), and a free buffer 117 (described below) and/or a global buffer 118 (described below) in order to determine and manage sub-process 115 executions. Although illustrated as a single RCOF 109 in the enterprise server 102, two or more RCOFs 109 may be used in the enterprise server 102 according to particular needs, desires, or particular implementations of example distributed computing system 100. For example, a first RCOF 109 can manage a first set of sub-processes with respect to CPU availability while a second RCOF 109 can manage a second set of sub-processes with respect to file I/O. In some implementations the first RCOF 109 and the second RCOF 109 can jointly manage the same sub-processes in whole or in part.

In some implementations, a particular RCOF 109 can operate in response to and in connection with at least one request received from an associated business application 108, RCOF 109, PPE 110, Agent 111, and/or client 140. Additionally, a particular RCOF 109 may operate in response to and in connection with at least one request received from other business applications 108, RCOFs 109, PPEs 110, and/or agents 111, including business applications 108, RCOFs 109, PPEs 110, and/or agents 111 associated with another enterprise server 102. In some implementations, each RCOF 109 can represent a web-based application accessed and executed by remote clients 140 using the network 130 (e.g., through the Internet, or using at least one cloud-based service associated with the RCOF 109). For example, a portion of a particular RCOF 109 may be a web service associated with an RCOF 109 that is remotely called, while another portion of the particular RCOF 109 may be an interface object or agent bundled for processing at a remote client 140. Moreover, any or all of a particular RCOF 109 may be a child or sub-module of another software module or enterprise application (not illustrated) without departing from the scope of this disclosure. Still further, portions of the particular RCOF 109 may be executed or accessed by a user working directly at the enterprise server 102, as well as remotely at a corresponding client 140.

The PPE 110 is a service or stand-alone application used by the RCOF 109 to determine and/or process one or more partially parallel-executable sub-processes 115. In some implementations, the PPE 110 can calculate one or more free buffers 117 (described below) and/or one or more global buffers 118 (described below) per process/sub-process. In some implementations, the PPE 110 uses the process model 116 to calculate free buffers 117 and/or global buffers for each sub-process. In other implementations, the PPE 110 can use data received from a dynamic process (not illustrated) to calculate free buffers 117 and/or global buffers 118. The PPE may also use one or more agents 111 (described below) and a free buffer 117 and/or a global buffer 118 in order to determine and process sub-process 115 executions. In some implementations, the PPE 110 can use particular algorithms to perform its functions, for example in calculating the free buffer 117 and/or global buffer 118. Algorithms may include, for example, round-robin, time-slice, and/or other suitable algorithms. In some implementations, the PPE 110 may provide the algorithms to the RCOF 109 for RCOF 109 processing purposes.

Although illustrated as a single PPE 110 in the enterprise server 102, two or more PPEs 110 may be used in the enterprise server 102 according to particular needs, desires, or particular implementations of example distributed computing system 100. The PPE 110 can be any application, program, module, process, or other software that may provide methods and a graphical user interface necessary to perform its functions. In some implementations, the PPE 110 can provide an API 112 as in interface with other components of the example distributed computing system 100.

In some implementations, a particular PPE 110 can operate in response to and in connection with at least one request received from an associated business application 108, RCOF 109, agent 111, and/or client 140. Additionally, a particular PPE 110 may operate in response to and in connection with at least one request received from other business applications 108, PPEs 110, and/or agents 111, including business applications 108, PPEs 110, and/or agents 111 associated with another enterprise server 102. In some implementations, each PPE 110 can represent a web-based application accessed and executed by remote clients 140 using the network 130 (e.g., through the Internet, or using at least one cloud-based service associated with the PPE 110). For example, a portion of a particular PPE 110 may be a web service associated with a PPE 110 that is remotely called, while another portion of the particular PPE 110 may be an interface object or agent bundled for processing at a remote client 140. Moreover, any or all of a particular PPE 110 may be a child or sub-module of another software module or enterprise application (not illustrated) without departing from the scope of this disclosure. Still further, portions of the particular PPE 110 may be executed or accessed by a user working directly at the enterprise server 102, as well as remotely at a corresponding client 140. In some implementations, the PPE 110 can be used to configure the process model 116 dependencies, sub-process CPU consumption values, and other suitable data and/or to retrieve these values from one or more process components of the example distributed computing environment 100.

The agent 111 is a service or stand-alone application used by the RCOF 109 and/or PPE 110 to create, run, block, and/or terminate a sub-process 115 associated with a process 114. In some implementations, the agent 111 can perform other functions consistent with this disclosure. The agent 111 also communicates with the RCOF 109 and/or the PPE 110 to provide data about a sub-process, for example timestamps, CPU usage, and/or other suitable data. The agent 111 can be any application, program, module, process, or other software that may provide methods and a graphical user interface necessary to perform its functions. In some implementations, the agent 111 uses the process model 116, the PPE 110, and a free buffer 117 (described below) and/or a global buffer 118 (described below) in order to perform its functions. In some implementations, a particular agent 111 can operate in response to and in connection with at least one request received from an associated business application 108, RCOF 109, PPE 110, agent 111, and/or client 140. Additionally, a particular agent 111 may operate in response to and in connection with at least one request received from other business applications 108, RCOFs 109, PPEs 110, and/or agents 111, including business applications 108, RCOFs 109, PPEs 110, and/or agents 111 associated with another enterprise server 102. In some implementations, each agent 111 can represent a web-based application accessed and executed by remote clients 140 using the network 130 (e.g., through the Internet, or using at least one cloud-based service associated with the agent 111). For example, a portion of a particular agent 111 may be a web service associated with an agent 111 that is remotely called, while another portion of the particular agent 111 may be an interface object or agent bundled for processing at a remote client 140. Moreover, any or all of a particular agent 111 may be a child or sub-module of another software module or enterprise application (not illustrated) without departing from the scope of this disclosure. Still further, portions of the particular agent 111 may be executed or accessed by a user working directly at the enterprise server 102, as well as remotely at a corresponding client 140.

The client 140 may be any computing device operable to connect to or communicate with at least the enterprise server 102 using the network 130. In general, the client 140 comprises a computer operable to receive, transmit, process, and store any appropriate data associated with the example distributed computing system 100.

The illustrated client 140 further includes a client application 146. The client application 146 is any type of application that allows the client 140 to request and view content on the client 140. In some implementations, the client application 146 can be and/or include a web browser. In some implementations, the client-application 146 can use parameters, metadata, and other information received at launch to access a particular set of data from the server 102. Once a particular client application 146 is launched, a user may interactively process a task, event, or other information associated with the enterprise server 102. Further, although illustrated as a single client application 146, the client application 146 may be implemented as multiple client applications in the client 140.

The illustrated client 140 further includes an interface 152, a processor 144, and a memory 148. The interface 152 is used by the client 140 for communicating with other systems in a distributed environment—including within the example distributed computing system 100—connected to the network 130; for example, the enterprise server 102 as well as other systems communicably coupled to the network 130 (not illustrated). The interface 152 may also be consistent with the above-described interface 104 of the enterprise server 102 or other interfaces within the example distributed computing system 100. The processor 144 may be consistent with the above-described processor 106 of the enterprise server 102 or other processors within the example distributed computing system 100. Specifically, the processor 144 executes instructions and manipulates data to perform the operations of the client 140, including the functionality required to send requests to the enterprise server 102 and to receive and process responses from the enterprise server 102. The memory 148 may be consistent with the above-described memory 107 of the enterprise server 102 or other memories within the example distributed computing system 100 but storing objects and/or data associated with the purposes of the client 140.

Further, the illustrated client 140 includes a GUI 142. The GUI 142 interfaces with at least a portion of the example distributed computing system 100 for any suitable purpose, including generating a visual representation of a web browser. In particular, the GUI 142 may be used to view and navigate various web pages located both internally and externally to the enterprise server 102. Generally, through the GUI 142, an enterprise server 102 user is provided with an efficient and user-friendly presentation of data provided by or communicated within the example distributed computing system 100.

There may be any number of clients 140 associated with, or external to, the example distributed computing system 100. For example, while the illustrated example distributed computing system 100 includes one client 140 communicably coupled to the enterprise server 102 using network 130, alternative implementations of the example distributed computing system 100 may include any number of clients 140 suitable to the purposes of the example distributed computing system 100. Additionally, there may also be one or more additional clients 140 external to the illustrated portion of the example distributed computing system 100 that are capable of interacting with the example distributed computing system 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 is intended to encompass any computing device such as a desktop computer, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the enterprise server 102 or the client 140 itself, including digital data, visual information, or a GUI 142, as shown with respect to the client 140.

Figure 2:
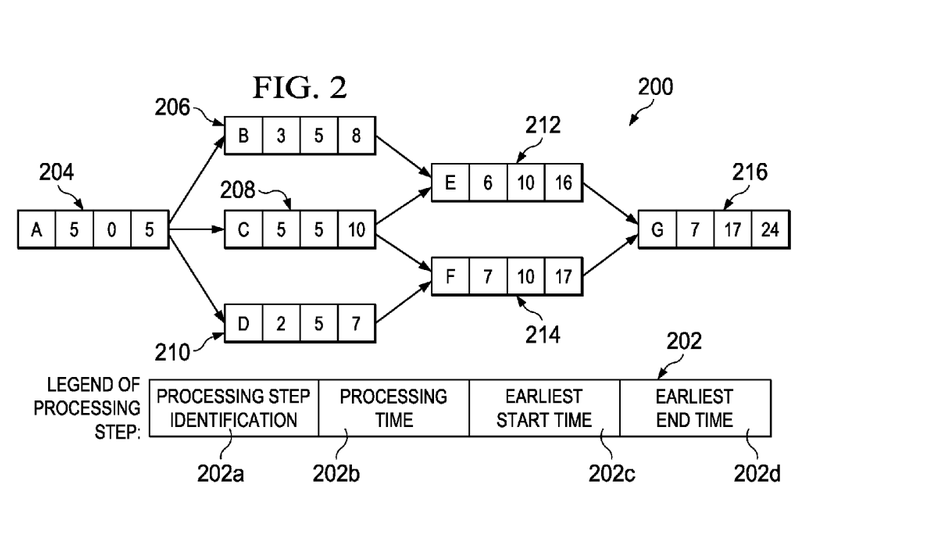
FIG. 2 is a block diagram illustrating dependent sub-process steps of a parallel-processing capable process.

Turning now to FIG. 2, FIG. 2 is a block diagram 200 illustrating dependent sub-process steps of a parallel-processing capable process 114. For clarity of presentation, the description that follows generally describes block diagram 200 in the context of FIG. 1. However, it will be understood that block diagram 200 may be described, for example, by any other suitable system, environment, software, and hardware, or a combination of systems, environments, software, and hardware as appropriate.

Process 114 is divided into sub-processes A, B, C, D, E, F, and G. (204, 206, 208, 210, 212, 214, and 216, respectively). Each sub-process can be described, for example, by legend 202. Legend 202 shows that a process can be described with a processing step 1D (PID) 202a, an overall processing time (OPT) 202b, an earliest processing start time (EPS) 202c, and an earliest processing end time (EPE) 202d. Time may be represented by the variable unit 't.' The PID 202a identifies an identifier of a particular sub-process. The OPT 202b indicates the amount of t that the particular sub-process takes overall to process. The EPS 202c indicates the earliest t that a sub-process may start to process. The EPE 202d indicates the earliest t a sub-process will end its processing. For example, sub-process A 204 is illustrated as having a PID 202a of "A", an OPT 202b of t=5, an EPS 202c of t=0, and an EPE 202d of t=5.

Dependencies of the sub-processes are illustrated in FIG. 2. In some implementations, these dependencies are stored in the process model 116. For example, sub-process 204 (PID A) calls out to three sub-processes, sub-process 206 (PID B), sub-process 208 (PID C), and sub-process 210 (PID D) which can be executed in parallel. The same can be said for PID C calling out to sub-process 212 (PID E) and sub-process 214 (PID F). Note, however, that PID E can only be executed after PID B and PID C complete. Likewise, PID F can only execute after PID C and PID D complete. Similarly, sub-process 216 (PID G) can only execute after PID E and PID F complete.

As shown in FIG. 2, PID A has an EPS t=0 meaning it starts at t=0. PID B, PID C, and PID D have an EPS t=5 (after PID A finishes). PID E and PID F have an EPS t=10. PIDs E and F start after PID D finishes. Note that PID E was also waiting for PID B to finish but it finished at EPE t=8 and PID F waited for the end of PID D which finished at EPE t=7. PID G starts at EPS t=17 following completion of PID E at EPE t=16 and PID F at EPE t=17.

Note that a critical path exists in the overall process. The sub-processes PID A-PID C-PID F-PID G must be processed with the earliest possible EPS in order to avoid an overall delay (here t=24). It may be possible to time-shift the other sub-processes, but not sub-processes defined by PIDs ACFG. Therefore, PIDs A-C-F-G form a critical path in the overall process execution.

Some sub-processes can be time-shifted without delaying the overall process 114 and/or other sub-processes 116. The free buffer 117 describes an amount of time (t) that a particular sub-process 116 can be shifted without affecting the start time of any later sub-process 116. For example, sub-process 206 has a OPT of 3 meaning that it could be shifted t+2 to start at EPS t=7 and finish at EPE t=10. In this case, it would finish at the same time as PID C with EPE t=10 and would not affect the start of PID D starting at EST t=10. In contrast, the global buffer 118 describes an amount oft that a particular sub-process can be shifted in t without shifting the overall process end t. For example, PID B may also be time-shifted t=3. This time-shifting would then delay the start of PID E to start at an EPS of t=11 but still complete at the same EPE t=17 as PID F and not interfering with the EPS t=17 or EPE t=24 of PID G. Since another sub-process' start time has been affected, the time-shift of t=3 cannot be considered a free buffer 117, but can be considered a global buffer 118 because the overall process EPE t=24 has not been changed. In some implementations, the global buffer 118 and/or the free buffer 117 may be defined and/or stored in a file, database, data structure, or any other suitable method of storing data. Although the free buffer 117 and global buffer 118 as illustrated as being stored in memory 107, the free buffer 117 and/or global buffer 118 may be stored in any location internal and/or external to the components of the example distributed computing system 100 in a manner consistent with the free buffer 117 and/or the global buffer 118 being associated with a particular sub-process.

Figure 3:
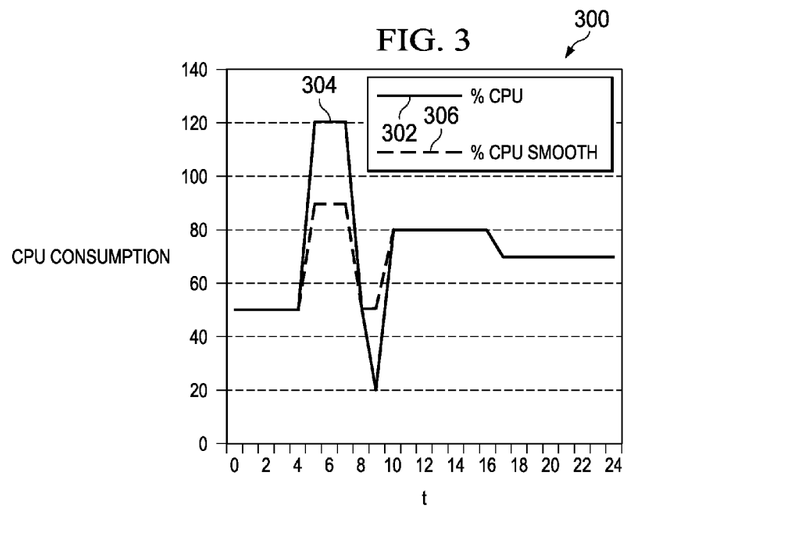
FIG. 3 is a block diagram illustrating computational CPU-resource leveling through time shifting of sub-processes.

Turning now to FIG. 3, FIG. 3 is a block diagram 300 illustrating computational CPU resource leveling through time shifting of sub-processes. For clarity of presentation, the description that follows generally describes block diagram 300 in the context of FIGS. 1-2. However, it will be understood that block diagram 300 may be described, for example, by any other suitable system, environment, software, and hardware, or a combination of systems, environments, software, and hardware as appropriate. Although FIG. 3 details CPU resource leveling, one of ordinary skill will appreciate that this same methodology could be applied to a multitude of other resources within the example distributed computing system 100, for example, network bandwidth, file I/O limitations, memory speed, etc.

If every sub-process has a defined CPU consumption in % of the overall available CPU capacity, it is possible to determine results of processing the sub-processes with various EPS values. For example, if defined CPU consumption values are PID A=50%, PID B=30%, PID C=20%, PID D=70%, PID e=40%, PID F=40%, and PID G=70%, then the overall CPU resource consumption curve is illustrated in FIG. 3 at 302. Here, if all sub-processes start at the earliest EPS possible, the overall CPU consumption would be too high, particularly when PID B, PID C, and PID D are processed in parallel as shown at 304. Any algorithm, for example a time-slice or round-robin algorithm, that tries to equally share resources ends up slowing down all of them. And as PID C is part of the critical path defined above, the overall processing deadline EPE t=24 for PID G would be violated.

However, if PID B is simply time-shifted (here a delayed) by t=2 to an EPS of 7, then from t=5-7 only PID C and PID D is processed at 90% CPU and from t=7-10, PID B and PID C are processed at 50% CPU. The overall CPU resource consumption curve for a time-shift of t=2 for the EPS of PID B is illustrated in FIG. 3 at 306. This time-shift ensures that the critical path EPE of t=24 is not violated. In some implementations, it can be possible time-shift to both accelerate and/or delay the start of a sub-process.

Figure 4:
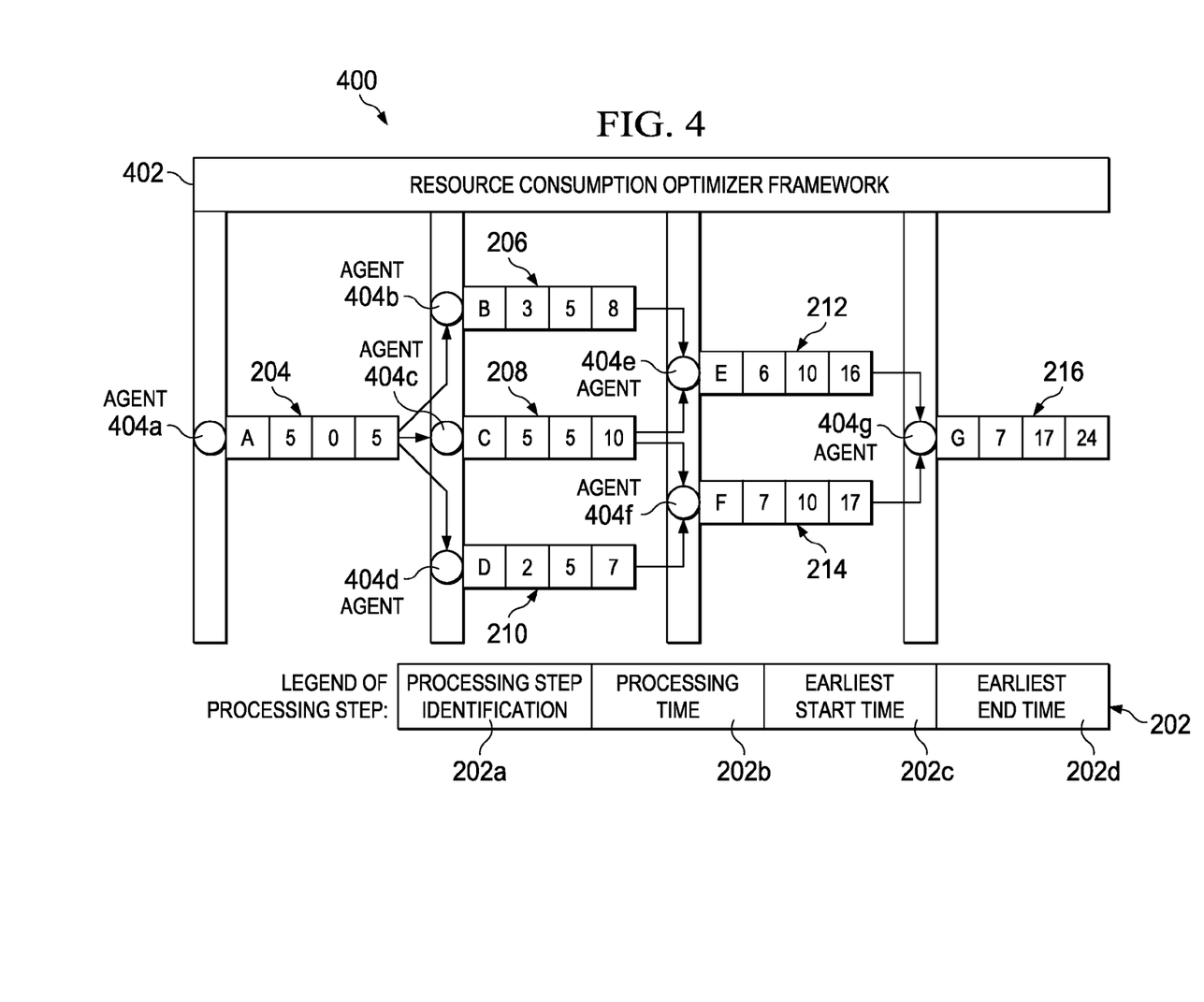
FIG. 4 is a block diagram illustrating a Resource Consumption Optimizer Framework (RCOF) and agents in relation to dependent sub-process steps of a parallel-processing capable process.

Turning now to FIG. 4, FIG. 4 is a block diagram 400 illustrating a RCOF 109 and agents 111 in relation to dependent sub-process steps of a parallel-processing capable process. For clarity of presentation, the description that follows generally describes block diagram 300 in the context of FIGS. 1-3. However, it will be understood that block diagram 400 may be described, for example, by any other suitable system, environment, software, and hardware, or a combination of systems, environments, software, and hardware as appropriate.

The RCOF 402 is illustrated in FIG. 4. Associated with the RCOF 402 are a number of agents, for example 404a-404g and a PPE (not illustrated). In some implementations, a single agent is associated with a single sub-process, for example, agent 404a and sub-process 204 (PID A). In other implementations, one or more agents can be associated with one or more sub-processes.

In general, an agent acts to prohibit or to permit the operation of a sub-process. For example, agent 404a may prohibit or permit PID A to start executing. Likewise, agent 404e may prohibit PID E from starting until both agents 404b and 404c have indicated to the RCOF 402 that PID B and PID C have successfully completed. In one example, RCOF 402 may be aware of all active agents, possibly through use of the process model 116, and directly notify agent 404e following its notification by agents 404b and 404c that PID B and PID C completed processing and that PID E may start. In some implementations, the RCOF 402 may be able to notify and/or actively "call" an agent through the use of an API 112 provided by each agent. For example, an agent could expose a "delay"/"block" function through the API 112 allowing the RCOF 402 to actively control the agent in order to better manage sub-process execution in real-time. In other implementations, agent 404e may need to query the RCOF 402 or receive a notification message generated by the RCOF 402 for permission to allow PID E to start processing. Unless permission is granted by the RCOF 402, PID E execution will remain blocked. In some implementations, agents may actively poll the RCOF 402 according to a predefined or dynamically generated poll rate. In some implementations, agents may also pass timestamps to the RCOF 402 to permit a check of expected and real-time resource consumption for a sub-process. This additional data may allow the RCOF to update in real-time the resource consumption values, the process model 116, and/or an in-use process optimization pattern. For example, referring to the example of FIG. 3, the RCOF could update real-time CPU resource consumption values, the process model 116, and/or an in-use process optimization pattern.

In optimizing the processing of the overall process, the RCOF 402 typically takes into account free buffers first, followed by global buffers. These values, as well as others may be retrieved from the process model 116. In some implementations, the RCOF 402 may use linear optimization methods, both known and proprietary, to determine optimal processing optimization patterns. For example, optimization patterns could include "as smooth as possible over time," "keep threshold values under all circumstances" (which could include, in some implementations, extending global buffers), and other suitable default and/or user-defined optimization patterns. In some instances, a user may be presented with an opportunity to select from a plurality of suggested and/or existing process optimization patterns, possibly through a graphical user interface. In some implementations, the RCOF 402 may user various other system components to simulate multiple processing possibilities in order to select an optimal process optimization pattern prior to starting processing of an overall process. In these instances, a user may be provided an opportunity to select a simulated optimal process optimization pattern to use in processing a particular process.

Figure 5:
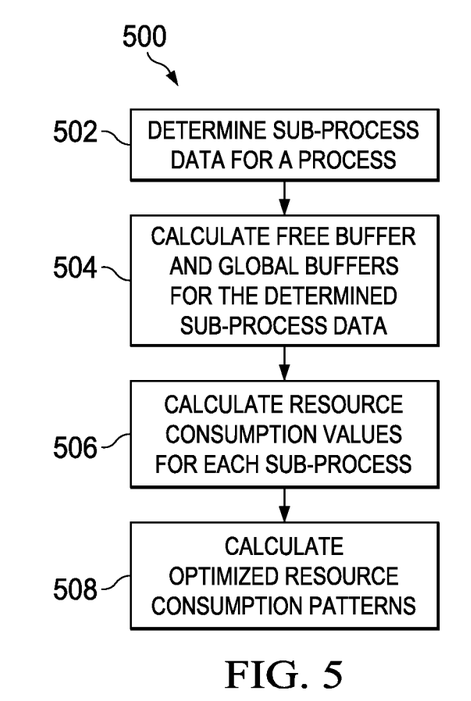
FIG. 5 is a flow chart for determining sub-process related data for critical path, resource optimized, parallel processing.

Turning now to FIG. 5, FIG. 5 FIG. 5 is a flow chart for determining sub-process related data for critical path, resource optimized, parallel processing. For clarity of presentation, the description that follows generally describes method 500 in the context of FIGS. 1-4. However, it will be understood that method 500 may be performed, for example, by any other suitable system, environment, software, and hardware, or a combination of systems, environments, software, and hardware as appropriate. For example, one or more of the enterprise server, the client, or other computing device (not illustrated) can be used to execute method 500 and obtain any data from the memory of the client, the enterprise server, or the other computing device (not illustrated).

At 502, sub-process data is determined for a process. Sub-process data may include applicable sub-processes, which sub processes may execute in parallel, critical path information, PID, OPT, EPS, and/or EPE time information, agent associations, and/or sub-process dependencies. In some implementations, sub-process data is manually determined and stored in the process model. In other implementations, the sub-process data is determined, in whole or in part, by the PPE and stored in the process model. In other implementations, the PPE and one or more other components, for example the RCOF, may together calculate, in whole or in part, the sub-process data. From 502, method 500 proceeds to 504

At 504, free buffers and/or global buffers are calculated for the determined sub-process data. In some implementations, the free buffers and/or global buffers are determined by the PPE. In other implementations, the PPE and one or more other components, for example the RCOF, may together calculate, in whole or in part, the free buffers and/or the global buffers. From 504, method 500 proceeds to 506.

At 506, resource consumption values are calculated for each process. For example, CPU resource consumption values could be calculated for each sub-process in order to determine optimum CPU resource consumption patterns and/or other resource consumption patterns including CPU resource consumption values. In some implementations, resource consumption values can be calculated by the PPE. From 506, method 500 proceeds to 508.

At 508, optimized resource consumption patterns are calculated. In some implementations, the calculated optimized resource consumption patterns are calculated by the ROCF. In other implementations, the ROCF and one or more other components, for example the PPE, may together calculate, in whole or in part, the optimized resource consumption patterns. From 508, method 500 proceeds to FIG. 6.

Figure 6:
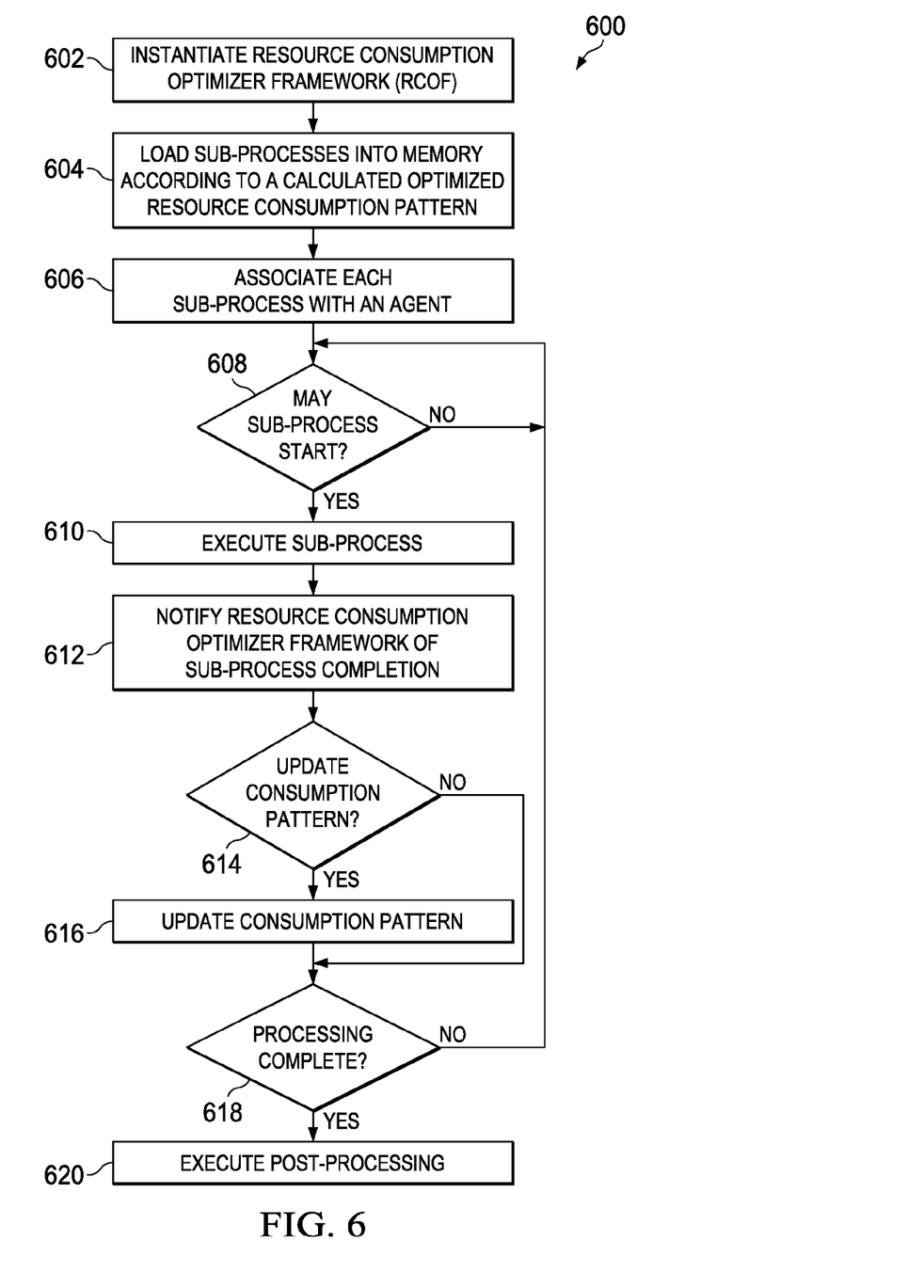
FIG. 6 is a flow chart for critical path, resource optimized, parallel processing.

Turning now to FIG. 6, FIG. 6 is a flow chart for critical path, resource optimized, parallel processing. For clarity of presentation, the description that follows generally describes method 600 in the context of FIGS. 1-5. However, it will be understood that method 600 may be performed, for example, by any other suitable system, environment, software, and hardware, or a combination of systems, environments, software, and hardware as appropriate. For example, one or more of the enterprise server, the client, or other computing device (not illustrated) can be used to execute method 600 and obtain any data from the memory of the client, the enterprise server, or the other computing device (not illustrated).

At 602, a resource consumption optimizer framework (RCOF) is instantiated. From 602, method 600 proceeds to 604

At 604, process associated sub-processes are loaded into memory according to the calculated optimized resource consumption pattern (see FIG. 5). From 604, method 600 proceeds to 606.

At 606, each sub-process in memory is associated with at least one agent. In some implementations, the RCOF performs the assignment of the agents to the sub-processes. In some implementations, agents may be queried by the RCOF to determine their readiness. In other implementations, agents may actively notify the RCOF of their readiness to proceed with processing. From 606, method 600 proceeds to 608.

At 608, a determination is made whether a sub-process may begin execution. If at 608, it is determined that the sub-process may begin execution, the agent associated with the sub-process permits the sub-process to execute and the method 600 proceeds to 610. In some implementations, the RCOF can directly instruct the agent through an exposed method using an agent associated API. In other implementations, the agent actively polls the RCOF or receives a notification message indicating that the agent is to permit the sub-process to execute. If at 608, however, it is determined that the sub-process may not execute, method 600 proceeds to 608.

At 610, the sub-process is executed. In some implementations, the RCOF can interrupt, delay, and/or terminate the execution of the sub-process. From 610, method 600 proceeds to 612.

At 612, the RCOF is notified of the sub-process execution completion. In some implementations, the sub-process associated agent can notify the RCOF of the sub-process execution completion. In other implementations, the RCOF can actively poll the agent and/or receive a notification message generated by the agent to indicate the execution completion of the sub-process. From 612, method 600 proceeds to 614.

At 614, a determination is made whether to update the calculated optimized resource consumption pattern based upon data received from one or more agents regarding sub-process completion. For example, if a process completes faster than expected or slower than expected, the RCOF may wish to update the calculated optimized resource consumption pattern to ensure efficient process completion. If at 614, it is determined that the calculated optimized resource consumption pattern should not be updated, method 600 proceeds to 618. If at 614, however, it is determined that that the calculated optimized resource consumption pattern should be updated, method 600 proceeds to 616 where the RCOF updates the calculated optimized resource consumption pattern. In some implementations, the process model is also updated to reflect changes to the calculated optimized resource consumption pattern and the PPE re-calculates appropriate free- and/or global buffers. In some implementations, the agents are notified of the changes to the calculated optimized resource consumption pattern and processing of sub-processes are modified accordingly.

At 618, a determination is made whether execution of all sub-processes is complete. If at 618, it is determined that execution of all sub-process is not complete, method 600 proceeds to 608. If at 618, however, it is determined that execution of all sub-process is not complete, method 600 proceeds to 620.

At 620, post-processing is executing. Post-processing may include updating the resource consumption optimizer framework, the process model, and the free buffer and/or global buffers. Post processing may also include generating a log and/or notifying one or more users by electronic communication, for example by an email message and/or text message. In some implementations, post-processing can also include notification to another process/sub-process. Other post-processing methods consistent with this disclosure will be apparent to those of skill in the art. After 620, method 600 stops.

While the subject of this disclosure focuses on parallel processing, one of ordinary skill with recognize other processing methods are equally applicable to the computer-implemented methods, computer-program products, and systems described herein. Therefore, this disclosure should not be read as limiting in any way the scope to only parallel-processing but as also encompassing any other suitable processing technique.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program include, by way of example, can be based on general or special purpose microprocessors or both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
    instantiating a resource consumption optimizer framework (RCOF) for a plurality of discrete sub-processes associated with a process, wherein dependency data stored in a process model defines dependencies between the plurality of the discrete sub-processes, and wherein each of the discrete sub-processes is defined with data including a processing step identification, an overall processing time, an earliest processing start time, and an earliest processing end time;
    loading the plurality of discrete sub-processes into a memory in accordance with a calculated optimized resource consumption pattern that uses the dependency data stored in the process model to identify a critical path, said critical path defining the dependent discrete sub-processes that must be processed with their earliest possible processing start time in order to avoid a delay in the overall processing end time;
    associating each discrete sub-process of the plurality of sub-processes with an agent, wherein the agent communicates with the RCOF;
    executing a particular discrete sub-process of the plurality of discrete sub-processes loaded into the memory, wherein the particular discrete sub-process' execution start is gated by an associated agent based upon at least a determined buffer value specifying either an amount of time the particular discrete sub-process' execution start can be shifted in time without affecting the start time of any later starting sub-process or without shifting an overall processing end time for the process; and
    notifying the RCOF of the particular discrete sub-process execution completion.

2. The computer-implemented method of claim 1, further comprising, prior to the loading of the discrete sub-processes into the memory, calculating the optimized resource consumption pattern.

3. The computer-implemented method of claim 1, wherein the agent exposes an application programming interface (API) to the RCOF.

4. The computer-implemented method of claim 1, further comprising determining that the particular discrete sub-process of the plurality of the discrete sub-processes loaded into the memory can start execution.

5. The computer-implemented method of claim 1, further comprising determining that the calculated optimized resource consumption pattern should be updated.

6. The computer-implemented method of claim 5, further comprising updating the calculated optimized resource consumption pattern.

7. The computer-implemented method of claim 1, further comprising determining when processing of the plurality of sub-processes is complete.

8. A computer-program product, comprising computer-readable instructions embodied on tangible, non-transitory, computer-readable media, the instructions operable when executed to perform operations to:
    instantiate a resource consumption optimizer framework (RCOF) for a plurality of discrete sub-processes associated with a process, wherein dependency data stored in a process model defines dependencies between the plurality of the discrete sub-processes, and wherein each of the discrete sub-processes is defined with data including a processing step identification, an overall processing time, an earliest processing start time, and an earliest processing end time;
    load the plurality of discrete sub-processes into a memory in accordance with a calculated optimized resource consumption pattern that uses the dependency data stored in the process model to identify a critical path, said critical path defining the dependent discrete sub-processes that must be processed with their earliest possible processing start time in order to avoid a delay in the overall processing end time;

associate each discrete sub-process of the plurality of sub-processes with an agent, wherein the agent communicates with the ROCF;

execute a particular discrete sub-process of the plurality of discrete sub-processes loaded into the memory, wherein the particular discrete sub-process' execution start is gated by an associated agent based upon at least a determined buffer value specifying either an amount of time the particular discrete sub-process' execution start can be shifted in time without affecting the start time of any later starting sub-process or without shifting an overall processing end time for the process; and notify the RCOF of the particular discrete sub-process execution completion.

9. The computer-program product of claim 8, further comprising, instructions operable to, prior to the loading of the discrete sub-processes into the memory, calculate the optimized resource consumption pattern.

10. The computer-program product of claim 8, wherein the agent exposes an application programming interface (API) to the RCOF.

11. The computer-program product of claim 8, further comprising instructions operable to determine that the particular discrete sub-process of the plurality of the discrete sub-processes loaded into the memory can start execution.

12. The computer-program product of claim 8, further comprising instructions operable to determine that the calculated optimized resource consumption pattern should be updated.

13. The computer-program product of claim 12, further comprising instructions operable to update the calculated optimized resource consumption pattern.

14. The computer-program product of claim 8, further comprising instructions operable to determine when processing of the plurality of sub-processes is complete.

15. A system, comprising:
memory operable to store a resource consumption optimizer framework (RCOF); and
at least one hardware processor interoperably coupled to the memory and operable to:
instantiate a resource consumption optimizer framework (RCOF) for a plurality of discrete sub-processes associated with a process, wherein dependency data stored in a process model defines dependencies between the plurality of the discrete sub-processes, and wherein each of the discrete sub-processes is defined with data including a processing step identification, an overall processing time, an earliest processing start time, and an earliest processing end time;
load the plurality of discrete sub-processes into a memory in accordance with a calculated optimized resource consumption pattern that uses the dependency data stored in the process model to identify a critical path, said critical path defining the dependent discrete sub-processes that must be processed with their earliest possible processing start time in order to avoid a delay in the overall processing end time;
associate each discrete sub-process of the plurality of sub-processes with an agent, wherein the agent communicates with the ROCF;
execute a particular discrete sub-process of the plurality of discrete sub-processes loaded into the memory, wherein the particular discrete sub-process' execution start is gated by an associated agent based upon at least a determined buffer value specifying either an amount of time the particular discrete sub-process' execution start can be shifted in time without affecting the start time of any later starting sub-process or without shifting an overall processing end time for the process; and
notify the RCOF of the particular discrete sub-process execution completion.

16. The system of claim 15, further operable to, prior to the loading of the discrete sub-processes into the memory, calculate the optimized resource consumption pattern.

17. The system of claim 15, wherein the agent exposes an application programming interface (API) to the RCOF.

18. The system of claim 15, further operable to determine that the particular discrete sub-process of the plurality of the discrete sub-processes loaded into the memory can start execution.

19. The system of claim 15, further operable to determine that the calculated optimized resource consumption pattern should be updated.

20. The system of claim 19, further operable to update the calculated optimized resource consumption pattern.

21. The system of claim 15, further operable to determine when processing of the plurality of sub-processes is complete.

* * * * *